Sept. 14, 1926.  
M. L. MARTUS ET AL  
1,599,908  
WIRE WINDING MACHINE FOR BATTERY ELEMENTS  
Filed April 7, 1925  
4 Sheets-Sheet 1
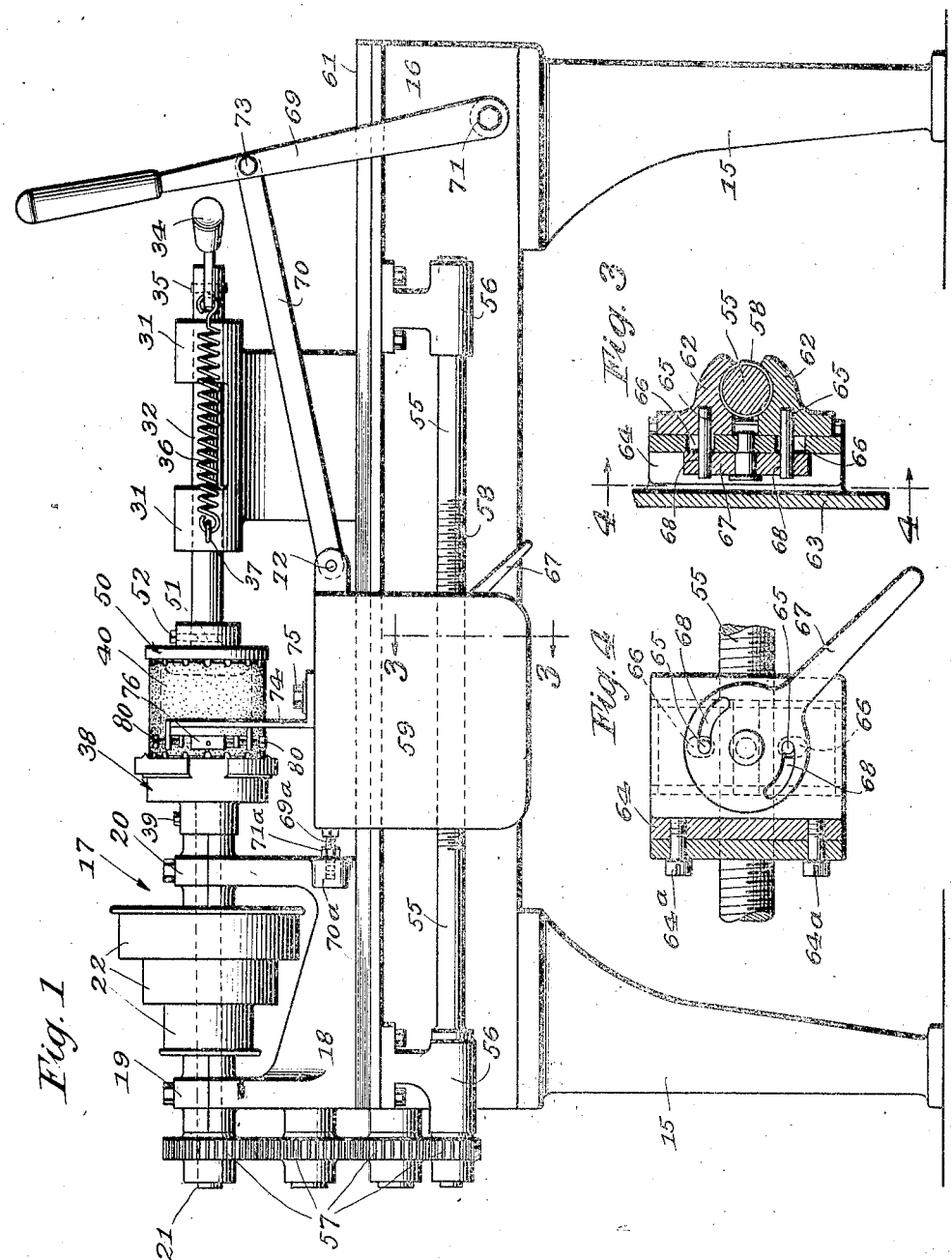
INVENTOR.  
Martin L. Martus and  
James G. Ross  
BY  
Chamberlain & Newman ATTORNEYS.

Sept. 14, 1926.  1,599,908
M. L. MARTUS ET AL
WIRE WINDING MACHINE FOR BATTERY ELEMENTS
Filed April 7, 1925  4 Sheets-Sheet 2
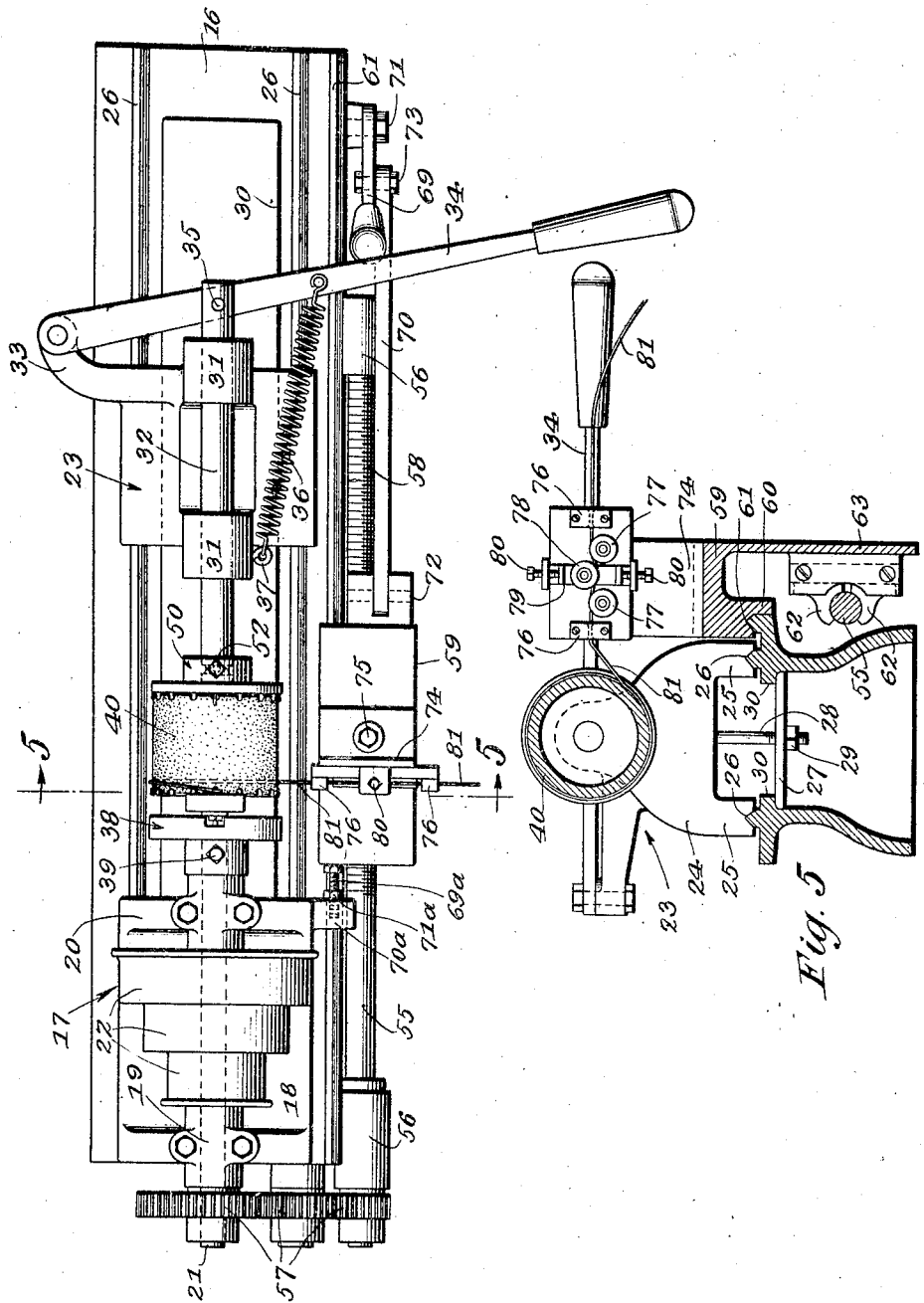
INVENTOR.
Martin L. Martus and
James G. Ross
BY
Chamberlain + Newman ATTORNEYS.

Sept. 14, 1926.  
M. L. MARTUS ET AL  
1,599,908  
WIRE WINDING MACHINE FOR BATTERY ELEMENTS  
Filed April 7, 1925     4 Sheets-Sheet 3
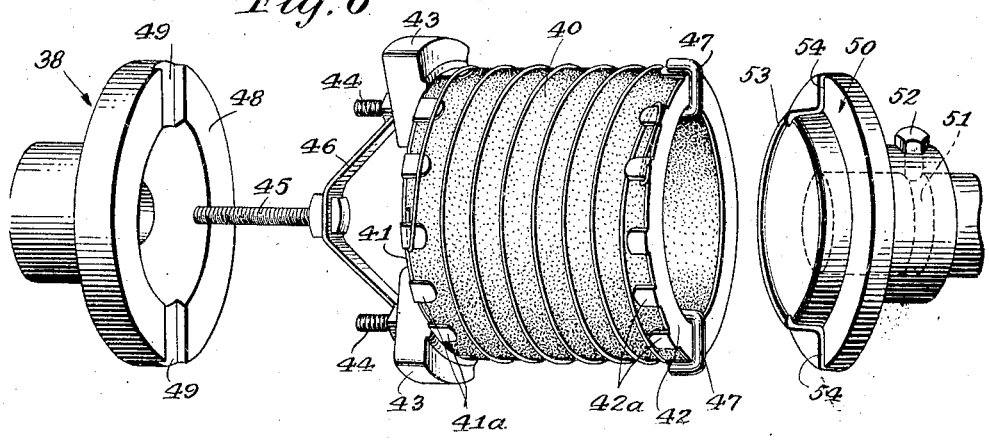
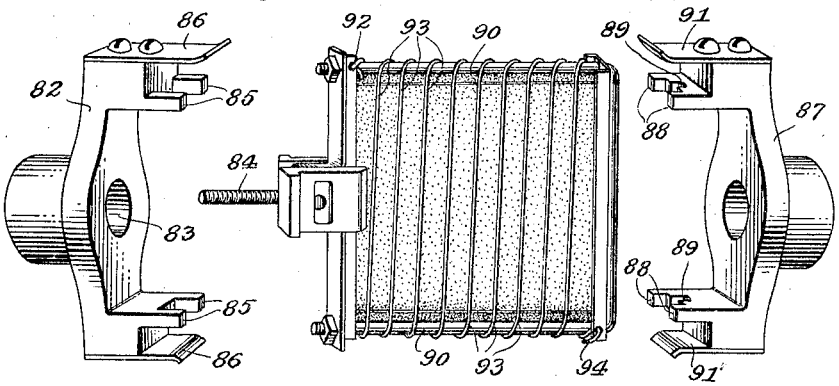
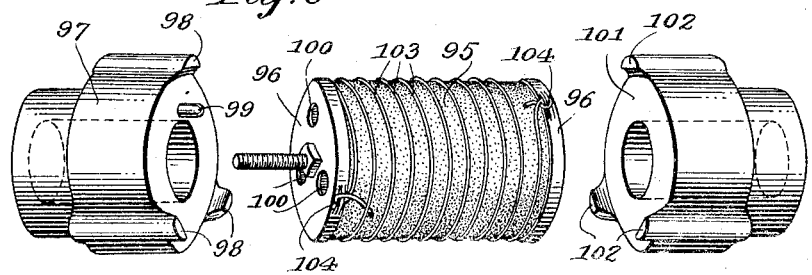
INVENTOR.  
Martin L. Martus and  
James G. Ross  
BY  
Chamberlain + Newman ATTORNEYS.

Sept. 14, 1926.
M. L. MARTUS ET AL
1,599,908
WIRE WINDING MACHINE FOR BATTERY ELEMENTS
Filed April 7, 1925    4 Sheets-Sheet 4
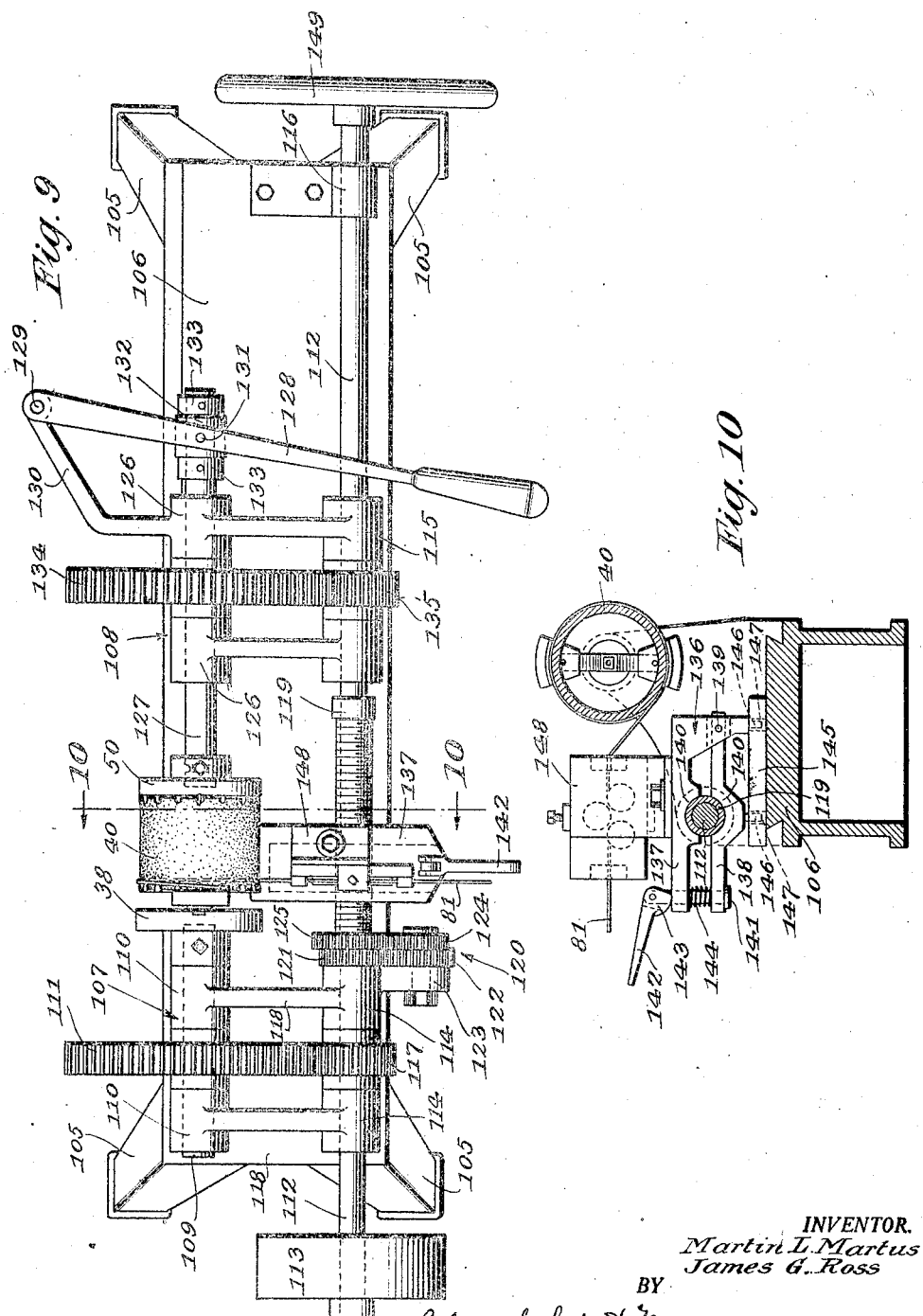
INVENTOR.
Martin L. Martus and
James G. Ross
BY
Chamberlain + Newman ATTORNEYS.

Patented Sept. 14, 1926.

1,599,908

UNITED STATES PATENT OFFICE.

MARTIN L. MARTUS, OF WOODBURY, AND JAMES G. ROSS, OF WATERBURY, CONNECTICUT.

WIRE-WINDING MACHINE FOR BATTERY ELEMENTS.

Application filed April 7, 1925. Serial No. 21,373.

This invention relates to new and useful improvements in wire winding machines for battery elements.

An object of the invention is to provide such a machine which is primarily designed for winding a reinforcing wire about the outer periphery of a compressed copper oxide primary battery electrode, such as that shown in the United States Patent Number 1,055,561.

Another object is to provide a machine of the character stated, in which the electrodes may be readily and quickly positioned to have the reinforcing wire wound about them, and from which the electrodes may be readily and quickly removed.

A further object is to provide a machine of the class described by means of which the wire is wound about the electrode in the form of a spiral, the convolutions of which are equally spaced, and automatically formed by the machine.

An additional object is to provide in connection with such a machine, means for receiving and mounting electrodes of different shapes and sizes.

Another object is to provide a method of providing a fragile element, disclosed as an electrode, with a reinforcement in the nature of a receptacle or basket which forms part of the complete object.

Compressed copper oxide battery electrodes are very fragile and for this reason it has been found desirable to reinforce them. It has been discovered that a wire wrapped about the periphery of the electrodes, the wire being tightly anchored at its ends, will prevent the electrode going to pieces in the event the same is broken into two or more large pieces. The wire is preferably wound in the form of an open spiral and forms a receptacle for the electrode.

The present invention provides means whereby the reinforcing wire which forms the receptacle above described may be wrapped about the electrode by mechanical means which automatically spaces the convolutions of the wire a predetermined distance apart the work being done accurately and expeditiously.

Referring to the accompanying drawings wherein for the purpose of illustration I have shown a satisfactory embodiment of my invention:—

Fig. 1 is a side elevation of a machine embodying the invention;

Fig. 2 is a plan view of the same;

Fig. 3 is a sectional view on the line 3—3 of Fig. 1;

Fig. 4 is a detail sectional view on the line 4—4 of Fig. 3;

Fig. 5 is a section on the line 5—5 of Fig. 2;

Figs. 6, 7 and 8 are perspective views of different forms of electrodes and the means for securing the respective forms in the wire winding machine;

Fig. 9 is a plan view of a modified form of the machine; and

Fig. 10 is a sectional view on the line 10—10 of Fig. 9.

Referring in detail to the drawings, the machine includes legs 15 upon which are mounted an elongated base or bed 16. A head-stock 17 is stationarily mounted on the bed at one end thereof, and includes a bracket 18 which has a pair of spaced bearings 19 and 20 for a driven shaft 21. Mounted on this shaft, at a point between the bearings, are a plurality of different sized pulleys 22 designed to be selectively driven to rotate the shaft at any desired speed, the drive being preferably from an overhead power shaft.

Slidably mounted on the bed in opposed relation to the head stock is a tail-stock 23. This tail-stock includes a bracket-like member 24 having spaced portions 25 notched at their under sides to receive the inverted V-shaped ribs or rails 26 formed integral with the upper surface of the bed 16. The bracket-like member 24 may be secured in desired position on the bed by means of plate 27 and bolt and nut 28 and 29 respectively (Figs. 4 and 5). When the nut is loosened the tail stock may be moved along on the bed to the desired position and then the nut 29 may be tightened to draw the plate 27 tightly into engagement with the under surface of the ledges 30 of the bed plate, to secure the tail-stock in its new position.

A pair of spaced bearings 31 are formed on the member 24 and slidably mount a rod or shaft 32 designed to be moved longitudinally toward and from the head-stock. Extending laterally of the member 24 is a bracket-arm 33 to the outer end of which is pivoted a hand-lever 34. This hand-lever intermediate its ends is received in a bifurcation in the rear end of shaft 32 and is pivotally connected to the shaft by means of a pin 35. By means of this lever the shaft may be reciprocated longitudinally. A coil spring 36 is connected at one end to the lever and at its other end to an eye 37 carried by one of the bearings 31. This spring normally urges the shaft 32 toward the head-stock.

Detachably secured to the inner end of the shaft 21, to rotate therewith, is a chuck 38 (see Figs. 1, 2 and 6). This chuck is secured to the shaft by means of a screw 39 or any other suitable means. Chuck 38 is particularly adapted for securing the electrode disclosed in Fig. 6. This electrode includes a cylindrical body portion 40 of compressed copper oxide, copper rings 41 and 42 arranged at the top and bottom respectively of the body. These rings each have integrally formed tabs or lugs 41$^a$ and 42$^a$ respectively, bent to engage over the edges of the body to secure the rings in place. Blocks of insulation 43 engage the upper ring 41 at spaced points and are held in place by means of tie-rods or bolts 44 which in turn are connected to a binding post 45 by means of a yoke 46. The lower ends of the tie-rods 44 are bent to form hooks 47 which engage the lower ring 42 and the lower edge of the body.

Chuck 38 is made hollow to receive the yoke and other projecting portions associated therewith. Also, the annular flange portion 48 of chuck 38 is provided with a pair of spaced recesses or notches 49 to accommodate the blocks of insulation 43, as best shown in Figs 2 and 6. In this manner a driving connection is formed between the chuck and the electrode.

A cooperating chuck member 50 is secured to the inner end of the shaft or rod 32 to rotate thereabout. To this end the shaft is grooved at 51 (see dotted lines Fig. 6), and the chuck member carries a screw 52, the inner end of which fits in the groove. By means of the screw and groove the chuck member 50 is held against all movements except a rotary movement relative to shaft 32. Chuck member 50 is provided with an annular projection 53 to fit within the lower end of the body 40, and has spaced grooves 54 to receive the hooked ends 47 of the tie-rods 44 to form a driving connection with the electrode.

A wire feeding means is mounted at one side of the machine and includes a feed shaft 55 mounted in brackets 56. Feed shaft 55 is driven from shaft 21 through a train of speed reducing gearing 57. The length of the thread 58 on shaft 55 is of course determined by the work to be performed. A carriage 59 has a depending portion 60 provided with a groove shaped to receive the inverted V-shaped rib 61 which is similar to the ribs 26 and which like them is formed integral with the upper surface of the bed 16. This rib coacting with the groove provides a guide for carriage 59.

The carriage 59 is fed longitudinally of the bed 16 by means of the thread 58 and shaft 55. Cooperating with thread 58 to enable it to feed the carriage 59, are a pair of threaded jaw-like members 62 carried by a depending portion 63 of the carriage and adapted to be moved to have their threaded surfaces brought into engagement with the thread 58 of shaft 55 as best shown in Fig. 3.

To provide for movement of the jaws 62 to operative and inoperative positions the same are slidably mounted by bracket 64 carried by and disposed at the inner side of the portion 63 of the carriage 59. Bracket 64 is secured to portion 63 by means of bolts 64$^a$. Pins 65 are secured to the jaws 62 and pass through vertical elongated openings 66. A headed lever 67 is pivotally mounted by the bracket and in its head portion is provided with a pair of arcuate cam slots 68 which receive the pins 65 (Figs. 3 and 4). Movement of this lever to draw the pins 65 downwardly in the slots 66 will cause the jaws 62 to grip the shaft 55 and their threaded portions will engage the thread 58 at opposite sides of the shaft.

The carriage being non-rotatable about the shaft 55, the jaws act as though they were a nut, held against rotation with the shaft, but having thread connection therewith, and the jaws being secured to the carriage. The jaws and carriage are fed along the shaft. When the lever 67 is swung upward from the position shown in Fig. 4, the jaws 62 are moved away from the shaft 55, and the carriage may be quickly moved to any desired position along the shaft, by manipulation of a lever 69, through the medium of a link 70. Lever 69 is pivoted to the bed at 71 while the link is pivoted at 72 to an ear on the carriage and at 73 to the lever at a point intermediate its ends. A screw 69$^a$ is threaded into an extension 70$^a$ on bracket 18, and the screw limits the return movement of carriage 59, after an electrode has been wound. When the screw is adjusted it is locked in place by jam nut 71$^a$. With the carriage abutting the screw 69ª the machine is positioned for a new piece of work. After the carriage is moved to its return position, and before operation of the machine begins, the jaws 62 are again closed on thread 58.

Mounted on top of the carriage 59 is a bracket 74, the same being secured to the carriage to move therewith, by means of a bolt 75. This bracket carries a pair of wire guides 76 arranged at the inner and outer edges of the bracket. Also, wire straightening rolls (Fig. 5) are mounted on the bracket. In the present instance three such rolls are shown, two of them 77 having their upper edges in alignment, and the third roll 78 being disposed between the rolls 77 and having its axis disposed lightly above their axes. The edges of the rolls overlap as shown and the wire being fed through them will be straightened. Center roll 78 may be adjusted vertically with its support 79 by means of screws 80.

In the operation of the machine on an electrode such as that shown in Fig. 6, the chuck 38 is secured to shaft 21 and chuck 50 is secured to shaft 32 and lever 34 is operated to retract shaft 32 and permit the placing of the electrode in the machine (as shown in Figs. 1 and 2) lever 34 being released to permit spring 36 to act to bring chuck 50 into engagement with the work. Next, wire 81 is passed through the guides 76 and the straightening rolls (Fig. 5) and secured at one end to one of the tabs 41ª.

The machine is now started, the jaws 62 being closed on thread 58. As the electrode is revolved with the chucks the wire is drawn under the electrode and at the same time the carriage is moving toward the right in Fig. 1, at a constant speed, and the wire is being wrapped about the body 40 of the electrode. When the end of the electrode is reached the machine is stopped, the wire cut and its end secured to tabs 42ª as shown in Fig. 6. The electrode is then removed from the machine the operation being complete.

The form of the electrode shown in Fig. 7 is such as to require different forms of chucks from that shown in Fig. 6. In Fig. 7 the electrode is flat and the chucks are correspondingly shaped. Chuck 82 is provided with an opening 83 to receive the terminal 84 from the electrode and in addition has prongs 85 which engage at each side of the electrode. Spring clips or plates 86 engage the edges of the electrode to frictionally secure the chucks in place and with the prongs 85 hold the chuck and electrode against relative movement when they are positioned in the machine. Chuck 82 is to be secured to drive shaft 21 of the machine.

A chuck 87 is also provided and is to be secured to shaft 32 of the machine. This chuck has prongs 88 to be disposed at each side of the electrode and has curved depressions 89 between each pair of prongs 88 to accommodate the connecting bar of U-bolt 90. A pair of spring clips or plates 91 similar to clips 86 of chuck 82 and for a light purpose are also provided on chuck 87.

When an electrode such as that disclosed in Fig. 7 is being wound, the wire is secured to the same as at 92 before the machine is started and when the spiral 93 is complete the other end of the wire is secure as at 94.

In Fig. 8 a still different form of electrode and co-operating chucks are shown. This electrode 95 includes upper and lower caps 96. A chuck, 97 is designed to be secured to the drive shaft 21 and shaft 21 and to receive the upper end of the electrode 95. This chuck has fingers 98 to engage the edges of the electrode and has a pin 99 to enter one of the openings 100 in cap 96. The pin 99 cooperates with the fingers 98 to hold the electrode 95 and chuck 97 against relative rotary movement while the electrode is in the machine.

Chuck 101 is similar to 97 with the single exception that it does not include the pin 99. However it does have fingers 102 similar to the fingers 98 of chuck 97. Chuck 101 is designed to be secured to shaft 32 of the machine, The coil 103 is wrapped about electrode 95 as in the cases of the electrodes shown in Fig. 6 and 7. However the ends of spiral 103 are secured to the respective caps 96 of electrode 95 (Fig. 8) as shown at 104. For this purpose spaced slits are made in the flanges of the caps and the space intermediate the strip pressed out to form anchors for the ends of the wire.

In Figs. 9 and 10 a modified form of wire winding machine is shown. This machine includes legs 105 and a bed 106. Disposed on the bed in opposed relation are a head-stock 107 and a tail-stock 108 respectively. The head-stock includes a driven shaft 109 mounted in spaced bearings 110 and is shown as having a chuck 38 detachably secured to its forward end. Shaft 109 has a relatively large gear 111 keyed to it. A drive shaft 112 is disposed along one side of the machine, the same being driven from any suitable source by power delivered to pulley 113. This shaft is mounted in bearings 114, 115, and 116. A gear 117 is keyed to this shaft at a point intermediate the bearings 114 and meshes with gear 111 on shaft 109. In this manner shaft 109 is driven. Bearings 110 and 114 are secured in pairs by bars 118, to hold the shafts 109 and 112 in rigid parallel relationship.

A sleeve 119 is mounted on shaft 112 but is free to rotate relative thereto. This sleeve has a feed screw formed on its outer surface for a purpose to be described. It is necessary that sleeve 119 be driven at a slower speed than the speed of rotation of shaft 112. To this end a speed reducing gear train 120 is used to drive the sleeve from the shaft. Of this train 120, gear 121 is keyed to shaft 112 and drives gear 122 supported by a bracket 123. Gear 122 has a gear 124 which rotates with it and which drives gear 125 that is keyed to sleeve 119.

The tail-stock includes bearings 126 which mount a shaft 127 for rotary and longitudinal movement. Shaft 127 has a chuck 50 secured thereto to rotate therewith. A lever 128 is pivoted at 129 to a bracket 130 which extends from one of the bearings 126. This lever intermediate its ends is pivoted as at 131 to a short sleeve 132 which is loosely mounted on the shaft 127 between a pair of stationary collars 133. As will be readily observed movement of lever 128 about its pivot 129 will move shaft 127 lengthwise to bring the chuck 50 toward and from the work.

In the form of machine now being described the tail-stock support a rotary chuck. This chuck is driven from shaft 112, then a pair of gears 134 and 135 identical with gears 111 and 117 respectively.

The wire feeding mechanism in this form of machine includes a carriage 136 which comprises upper and lower members 137 and 138 respectively. These members are pivoted together at 139 and have threaded portions 140 for cooperation with the thread on sleeve 119, to the end that the carriage may be fed longitudinally of the bed 106. A bolt 141 connects the outer ends of the members 137 and 138 and has a lever 142 pivoted to its upper end. Lever 142 includes a cam portion 143 designed to force the members 137 and 138 together, against the opposition of spring 144 which surrounds the bolt 141 and is interposed between the members. When the members are thus forced together their portions 140 (Fig. 9) are brought into engagement with the thread on sleeve 119 and if the machine is being operated the carriage 136 will be moved toward the right in Fig. 9.

Carriage 136 is detachably connected to a plate 145 which rests on bed 106, by means of pins 146. These pins project from the members 137 and 138 and fit loosely in holes 147 in the plate 145. As the carriage is fed along the bed by means of the feed screw on the sleeve 119, the plate 145 rides on the bed. When lever 142 is moved to permit the members 137 and 138 to open, member 138 is moved, by the spring 144, into engagement with the plate 145 and their member 137 is moved upwardly. The carriage may then be quickly slid along the bed on plate 145.

A bracket 148, carrying the same equipment as the bracket 74 of the machine shown in Figs. 1 through 5 is mounted on the carriage 136 and feeds the wire 81 to the work, in the manner described in connection with the machine first disclosed.

A hand wheel 149 is mounted on the shaft 112 and may be used to bring about prompt stoppage of the machine when the power is cut off.

In the operation of the machine shown in Figs. 9 and 10 the wire is fed to the work and drawn around the same as in the case of the machine first described. However in the modified form of machine the tail-stock as well as the head-stock is driven. Also, a slightly different form of wire feeding mechanism is used.

While we have shown and described a satisfactory embodiment of our invention it is to be definitely understood that we do not limit ourselves to the details of the disclosure. Many changes in construction and arrangement of parts will readily suggest themselves to those skilled in the art. Moreover, the invention is not limited to the winding of wire on battery electrodes but has many and varied uses. From all of the foregoing it will be appreciated that this disclosure is by way of illustration only and that reference must be had to the annexed claims for a definition of the limitations of the invention.

Having thus described our invention what we claim is:—

1. In a wire winding machine, a bed, a pair of chucks on the bed and adapted to receive the object to be wound between them, a driving shaft supported by the bed in parallel and spaced relation to the axis of said chucks; means for driving one of said chucks from said shaft, a tubular feed screw mounted for relative rotation on said shaft, means between said shaft and feed screw; for driving said feed screw from said shaft but at a different rate of speed, means on said bed for feeding wire to the object being wound, and means whereby said feed screw moves said wire feeding means along the object as the latter is being wound.

2. In a wire winding machine, a bed, a pair of chucks on the bed and adapted to receive the object to be wound between them, a driving shaft supported by the bed in parallel and spaced relation to the axis of said chucks, means for driving one of said chucks from said shaft, a tubular feed screw mounted for relative rotation on said shaft, means between said shaft and feed screw; for driving said feed screw from said shaft but at a different rate of speed, means on said bed for feeding wire to the object being wound, means whereby said feed screw moves said wire feeding means along the object as the latter is being wound, and means whereby the last named means may be rendered inoperative at will.

3. In a wire winding machine, a bed, a pair of chucks on the bed and adapted to receive an object to be wound between them, a driving shaft supported by the bed in parallel and spaced relation to the axis of the chucks, spaced means for driving said chucks from said shaft at equal speeds, a tubular feed screw mounted for relative rotation on said shaft between said spaced chuck driving means, means between said shaft and feed screw for driving said feed screw from said shaft but at a different rate of speed, means on said bed for feeding wire to the object being wound, and means whereby said feed screw moves said wire feeding means along the object as the latter is being wound.

Signed at Waterbury in the county of New Haven and State of Connecticut this 2nd day of March A. D. 1925.

MARTIN L. MARTUS.
JAMES G. ROSS.